T. J. MAYALL.

Rubber Articles.

No. 22,606.

Patented Jan'y 11, 1859.

WITNESSES

INVENTOR

UNITED STATES PATENT OFFICE.

THOMAS J. MAYALL, OF ROXBURY, MASSACHUSETTS, ASSIGNOR TO HIMSELF AND GEO. N. DAVIS.

IMPROVEMENT IN THE MANUFACTURE OF EMERY WHEELS AND STICKS.

Specification forming part of Letters Patent No. 22,606, dated January 11, 1859.

*To all whom it may concern:*

Be it known that I, THOMAS J. MAYALL, of Roxbury, in the county of Norfolk and State of Massachusetts, have invented a new and Improved Compound for the Purpose of Manufacturing Emery Wheels and Sticks, of which the following is a full, clear, and exact description, reference being had to the accompanying drawings, making part of this specification.

The compound which I employ is composed of what is generally known as "hard rubber" compound, tempered with olive-oil, with which a suitable portion of powdered emery has been incorporated to give it the required grit.

The following are the ingredients and their proportions which I have found to answer the purpose: one pound india-rubber, five ounces sulphur, five pounds emery, and one ounce olive-oil. The india-rubber and sulphur are incorporated in the manner usually adopted in the manufacture of vulcanized rubber, the olive-oil being added gradually as the ingredients are worked together, and ultimately the emery is added and the whole are worked together until intimately and uniformly mixed. The compound is then molded into suitable forms and is vulcanized at the temperature usually employed in the manufacture of hard vulcanized rubber.

The above are the quantities and proportions of the several ingredients which I have found best to answer the purpose; but these proportions are by no means rigid, as the quantity of both the emery and oil may be varied to some extent without materially affecting the result. The object of the olive-oil is to render the compound more elastic and tough. Without this addition the compound has been found to be so fragile, when a sufficient quantity of emery was incorporated with it, as to crack and break under the rough usage to which emery wheels and sticks are subjected.

Figure 1:
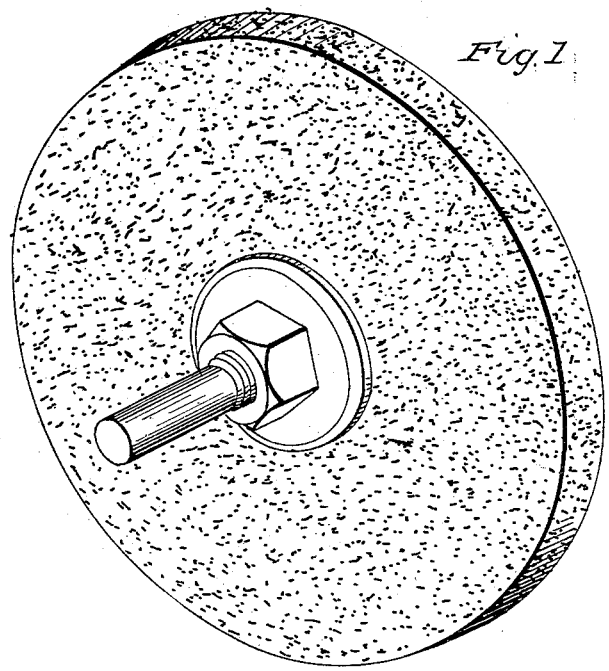
Figure 2:
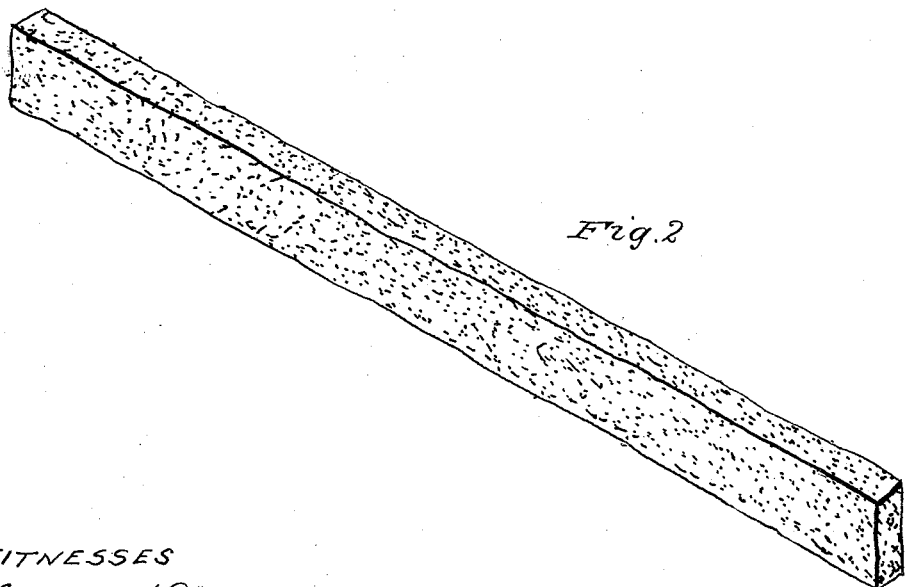

In Figure 1 of the accompanying drawings is represented a wheel formed with a body of hard rubber into which emery has been incorporated, as described above. Fig. 2 is an emery-stick formed of the same materials. The elasticity of the latter enables it to be bent so as to enter the sunken portions or curves of the metallic bodies to be polished, while the tenacity and toughness imparted to it by the olive-oil prevents it from cracking and breaking after the manner of the ordinary vulcanized hard rubber.

Thus far I have spoken of emery only as the grit employed to incorporate with the rubber. It is evident, however, that sand, glass, or any other suitable grit may be employed, the requisite quantity being incorporated with the rubber before it is vulcanized.

What I claim as my invention, and desire to secure by Letters Patent, is—

The employment of hard vulcanized rubber tempered with olive-oil, as set forth, in combination with powdered emery or its equivalent, for the manufacture of polishing wheels or sticks, as specified.

THOS. J. MAYALL.

Witnesses:
   THOS. R. ROACH,
   P. E. TESCHEMACHER.